United States Patent [19]

Kishi et al.

[11] Patent Number: 5,075,165

[45] Date of Patent: Dec. 24, 1991

[54] COMPOSITE PAINT FILM

[75] Inventors: Hiroyuki Kishi, Yokohama; Hitoshi Kimura, Chigasaki; Katsuya Yamamoto, Yokohama; Yoshinobu Tamura, Sagamihara; Tsuneo Sakauchi; Masahide Nagaoka, both of Yokohama; Yoichi Masubuchi, Hiratsuka; Eisaku Nakatani, Hiratsuka, all of Japan

[73] Assignee: Nissan Motor Company, Ltd., Yokohama, Japan

[21] Appl. No.: 521,955

[22] Filed: May 11, 1990

[30] Foreign Application Priority Data

May 18, 1989 [JP] Japan .................................. 1-122821

[51] Int. Cl.$^5$ ...................... B32B 27/38; C08G 59/14; C25D 13/08
[52] U.S. Cl. .................................. 428/331; 428/413; 428/414; 428/457; 428/463; 427/409; 427/410; 204/181.7; 523/403; 564/292
[58] Field of Search ............... 428/331, 413, 414, 457, 428/463

[56] References Cited

U.S. PATENT DOCUMENTS 3,984,299 10/1976 Jerabek et al. ...................... 523/415
4,017,438 3/1977 Jerabek et al. ...................... 523/420
4,087,479 5/1978 Toyota et al. ...................... 428/413

Primary Examiner—P. C. Sluby
Attorney, Agent, or Firm—Pennie & Edmonds

[57] ABSTRACT

A composite paint film formed on a steel sheet of an automotive vehicle body. The composite paint film comprises an electrodeposition paint film (I) coated on the steel sheet, and an intermediate coat paint film (II) coated on the first paint film. The electrodeposition paint film is formed of an epoxy-based cationic electrodeposition paint composition and has a minimum melt viscosity not less than 0.2 during hardening. The epoxy-based cationic electrodeposition paint composition includes an amine-added epoxy resin (1) of the type which may be hardened with a blocked isocyanate, a colloidal silica-containing gelled particulate (2), and an alkyltin ester compound of a liquid aliphatic carboxylic acid. The above-mentioned colloidal silica-containing gelled particulate is formed by dispersing a mixture of an acrylic copolymer having a hydrolizable alkoxysilane group and a cationic group and a cationic acidic colloidal silica in water to carry out a cross-linking reaction in particles of the colloidal silica. The second paint film (II) has a hardening starting time ranging from 15 to 20 minutes.

31 Claims, 1 Drawing Sheet

COMPOSITE PAINT FILM

BACKGROUND OF THE INVENTION

1. Field of the Invention

This invention relates to improvements in a composite paint film coated on a steel plate to improve rust resistance of the steel plate and a gloss and brightness character of the coated paint film coating, and more particularly to such an improved composite paint film to be coated on the outer panel of an automotive vehicle.

2. Description of the Prior Art

In general, a composite paint film for an automotive vehicle outer panel is constituted of an electrodeposition paint film for the purpose of rust prevention, an intermediate coat paint film for the purpose of thickening the composite film, and a finish coat paint film for the purpose of coloring. The automotive vehicle outer panel coated with such a composite paint film is required to have higher smoothness, gloss and the like. Total evaluation of such characteristics has been usually accomplished with a so-called PGD value which is measured by a PGD (Portable Gloss and Distinction) meter. This PGD meter is, for example, a PGD-3 type one produced by the Japan Colour Research Institute in Japan. It is known in the skilled in one art, that the PGD value becomes higher as the smoothness and gloss of the finish coating film is higher. Here, the gloss (or a gloss and brightness character) of the composite paint film coating depends on the performance of the finish coat paint film and seems to be an independent function of a finish coat paint. Concerning the smoothness, it is largely affected by the smoothness of under-coat films and therefore the electrodeposition paint film is eagerly required to have a high smoothness.

In conventional electrodeposition films, a measure to raise fluidity (i.e., to lower its melt viscosity) during baking has been taken in order to improve the smoothness of the electrodeposition film. There is an Oscillated Pendulum Analysis (OPA) with an oscillated pendulum type viscoelasticity measuring device, as a method of measuring the fluidity of an electrodeposition film during baking. The degree of the fluidity can be represented with a minimum melt viscosity ($\lambda$ min) determined by the measuring method.

Conventional electrodeposition paints have a minimum melt viscosity ($\lambda$ min) of 0.15 or lower according to the above measuring method. In connection with such electrodeposition paints, intermediate coat paints are designed to harden for as short a time as possible in order to ensure the smoothness of the coated paint film on a horizontal plane and to prevent deterioration of the smoothness of the same film on a vertical plane on which smoothness deterioration is caused by run of the coated paint film during baking. Additionally conventional intermediate coat paints have a hardening starting time, measured by the Oscillated Pendulum Analysis (OPA), from 2 to 15 minutes. Thus, the conventional composite paint films are expressed to be formed by coating the intermediate coat paint film having a hardening starting time shorter than 15 minutes (according to OPA) on the electrodeposition paint film having a minimum melt viscosity ($\lambda$ min) of 0.15 or lower (according to OPA).

In such conventional paint films, measures to increase the flowability of the coated electrodeposition paint film as discussed above have been taken. However, under the action of surface tension of the molten coated film at an edge portion of the steel plate of the automotive vehicle outer panel, the edge of the steel plate is exposed without the coat film, so that the above-discussed conventional composite paint film is inferior in so-called edge corrosion resistance.

If the edge corrosion resistance is intended to be improved in the conventional composite paint films, it may be proposed to increase the viscosity of the electrodeposition paint film while in a molten condition. For this purpose, measures have been proposed to increase the concentration of pigment in the electrodeposition paint (i.e., P(pigment)/B(binder) ratio), a measure to add non-molten type cross linking resin particles (i.e., a reology control agent) to the electrodeposition paint, and a measure to lower the hardening temperature to suppress flowability of the electrodeposition paint in a molten state under a cross-linking reaction. These measures are disclosed, for example, in U.S. Pat. Nos. 3984299 and 4017438, and Japanese Patent Provisional Publication No. 59 43013. However, any of these measures largely degrades the flowability of the electrodeposition paint in a molten state. Assuming that these measures are taken to obtain a good edge corrosion resistance, the smoothness of the coated surface of the electrodeposition paint is unavoidably deteriorated. Accordingly, in a case in which conventional intermediate and finish coats are formed on the thus formed electrodeposition paint film, the PGD value of the finish coat paint film on a horizontal plane largely lowers, thereby degrading the commercial value of the resultant automotive vehicle.

In view of the above, it has been eagerly desired in an automotive industry to obtain a composite paint film exhibiting both high edge corrosion resistance and good external appearance.

SUMMARY OF THE INVENTION

As a result of a variety of researches and developments for composite paint films exhibiting high edge corrosion resistance and high external appearance, the inventors have experimentally found that the PGD value on a horizontal plane is lowered while no change of the same value is made on a vertical plane, in a painting system which is constituted by coating conventional intermediate and finish coat paints on the surface of an electrodeposition paint film whose flowability is lowered (See Comparative Examples 1 and 5). Taking account of this, the relationship between the degrees of deterioration of smoothness (due to run) on the vertical plane and the hardening starting time measured by the OPA has been studied. As a result, it has been confirmed that in a case of the intermediate coat paint having a hardening starting time not more than 20 minutes, the PGD value on the vertical plane after coating of the finish coat paint is the same as in a case the conventional intermediate coat paint is used (See Comparative Examples 1 to 4).

Besides, it has been confirmed that the same result is obtained for the vertical plane even in a case of using a low flowability electrodeposition paint; however, the PGD value on the horizontal plane is different according to the electrodeposition paints and intermediate coat paints used (See Comparative Examples 1 to 8).

Extensive research and development by the inventors taking account of the above-discussed experimental results have revealed that improvements in both high edge corrosion resistance and high external appearance can be realized by a composite paint film of the present invention.

A composite paint film of the present invention comprises a first paint film (I) and a second paint film (II) coated on the first paint film. The first paint film is formed of epoxy-based cationic electrodeposition paint composition and has a minimum melt viscosity not less than 0.2 during hardening. The minimum melt viscosity is determined according to a logarithmic decrement of viscoelasticity of the first paint film and by an oscillated pendulum type viscoelasticity measuring device. The epoxy-based cationic electrodeposition paint composition includes an amine-added epoxy resin (1) of the type which may be hardened with a blocked isocyanate, a colloidal silica-containing gelled particulate (2) which is formed by dispersing a mixture of an acrylic copolymer having a hydrolizable alkoxysilane group and a cationic group and a cationic acidic colloidal silica in a water to carry out cross-linking reaction in particles of the colloidal silica, and an alkyltin ester compound (3) of a liquid aliphatic carboxylic acid. The second paint film (II) has a hardening starting time ranging from 15 to 20 minutes. The hardening starting time is determined according to a logarithmic decrement of viscoelasticity of the second viscoelasticity measuring device.

The thus configurated composite paint film of the present invention can offer significant advantages of greatly improving both the edge corrosion resistance of a steel plate and the external appearance (or the gloss and brightness character) of the coated paint film after application of the finish coat paint.

DETAILED DESCRIPTION OF THE INVENTION

Figure 1:
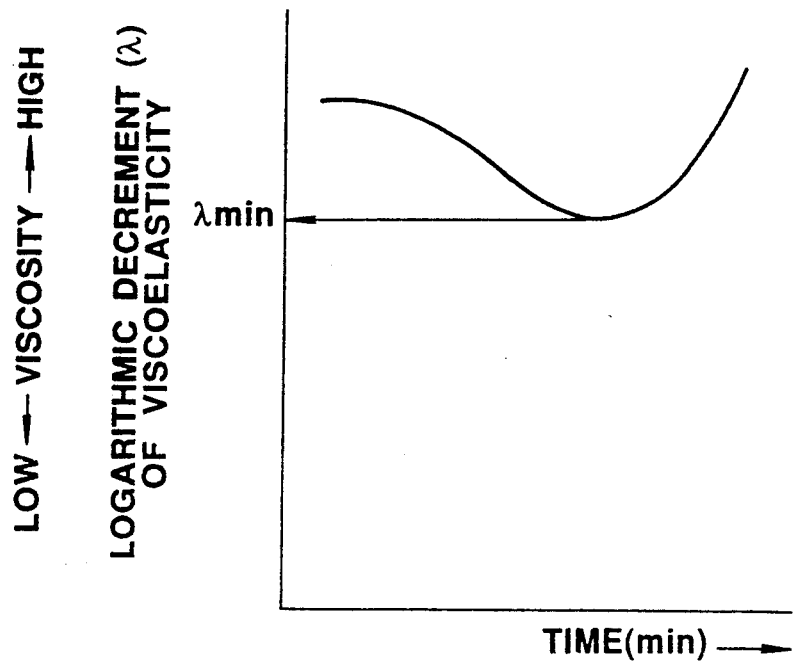
FIG. 1 is a graph showing the relationship between time and logarithmic decrement, for the purpose of determining the minimum melt viscosity ($\lambda$ min) of the first or electrodeposition paint film of the composite paint film according to the present invention.

According to the present invention, a composite paint film comprises a first or electrodeposition paint film (I) and a second or intermediate coat paint film (II) coated on the first paint film. The first paint film is coated on the surface, for example, of a steel plate or sheet forming part of an outer panel of an automotive vehicle.

The first paint film (I) is formed of epoxy based cationic electrodeposition paint composition and has a minimum melt viscosity not less than 0.2 during hardening. The minimum melt viscosity is determined according to a logarithmic decrement of viscoelasticity of the first paint film and by an oscillated pendulum type viscoelasticity measuring device. The epoxy-based cationic electrodeposition paint composition includes an amine-added epoxy resin (1) of the type which may be hardened with a blocked isocyanate, a colloidal silica-containing gelled particulate (2), and an alkyltin ester compound (3) of a liquid aliphatic carboxylic acid. The above-mentioned collidal silica-containing gelled particulate is formed by dispersing a mixture of an acrylic copolymer having a hydrolizable alkoxysilane group and a cationic group and a cationic acidic colloidal silica in a water to carry out cross-linking reaction in each particle of the colloidal silica.

The second or intermediate coat paint film (II) has a hardening starting time ranging from 15 to 20 minutes. The hardening starting time is determined according to a logarithmic decrement of viscoelasticity of the second film and by the oscillated pendulum type viscoelasticity measuring device.

In order to improve the edge corrosion resistance of the steel sheet or plate of the automotive vehicle body outer panel, the minimum melt viscosity of the first or electrodeposition paint film (I) is required to be not less than 0.2. This is because the edge corrosion resistance is inferior if the minimum melt viscosity is less than 0.2. Additionally, in order to achieve a minimum melt viscosity of not less than 0.2 upon taking account of combination of the second or intermediate coat paint film (II), the electrodeposition paint composition for the electrodeposition paint film (I) is required to include the amine-added epoxy resin (1), the colloidal silica-containing gelled particulate (2) and the alkyltin ester compound (3).

The amine-added epoxy resin (1) of the type which may be hardened with blocked isocyanate as a component of the electrodeposition paint film (I) will now be discussed. Examples of the such an amine added epoxy resin are an addition compound (a) formed by a reaction between a polyepoxide compound and a primary mono- or poly-amine, a secondary mono- or poly amine, or a primary and secondary mixed polyamine, for example, disclosed in U.S. Pat. No. 3984299; an addition compound (b) formed by a reaction between a polyepoxide compound and a secondary mono- or poly-amine having a ketimine-type primary amino group, disclosed for example in U.S. Pat. No. 4017438; and a reaction product (c) formed by an etherification between a polyepoxide compound and a hydroxyl compound having a ketimine-typed primary amino group, as disclosed for example in Japanese Patent Provisional Publication No. 59-43013.

The amine-added epoxy resin (1) is of the type having a blocked isocyanate group in its molecule, so that the amine-added epoxy resin can be cross-linked without any separate cross-linking agent. The amine-added epoxy resin may be of the type wherein there is no blocked isocyanate group in its molecule, so that the amine-added epoxy resin can be cross-linked with a blocked isocyanate which is separately contained as a cross-linking agent in a resin composition.

The polyepoxide compound as a raw material of the amine-added epoxy resin (1) preferably has at least two epoxy groups

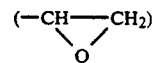

per molecule and has a number average molecular weight of at least 200. The number average molecular weight is preferably within a range of from 400 to 4000, and more preferably from 800 to 2000. Additionally, it is preferable that the polyepoxide compound is produced by a reaction between a polyphenol compound and epichlorohydrin.

The colloidal silica-containing gelled particulate (2) as a component of the cationic electrodeposition paint composition (II) is formed by dispersing the mixture of an acrylic copolymer having the hydrolizable alkoxysilane group and the cationic group and the cationic acidic colloidal silica in water to carry out cross-linking reaction in the particles of the colloidal silica. In the acrylic copolymer having the hydrolizable alkoxysilane group and the cationic group, the cationic group (preferably amino group neutralized with acid) serves as a water dispersion group so that the acrylic copolymer can be stably dispersed in water. The alkoxysilane group makes its hydrolysis to produce silanol groups which are condensed with each other upon their condensation reaction thereby to accomplish cross-linking in a particle in which the acrylic copolymer is also cross-linked with the collidal silica having a primary particle size less than 0.1 μm. The silanol group may also be condensed with a hydroxyl group in cases in which the acrylic copolymer has a hydroxyl group, thereby accomplishing the cross-linking with the colloidal silica within a colloidal silica particle. Thus, the colloidal silica-containing gelled particulate is formed.

The above-mentioned acrylic copolymer having the hydrolizable alkoxysilane and the cationic group is generally produced by copolymerization of mixed monomers including a polymerizable vinylsilane monomer (i) having a vinyl-type double bond and a hydrolyzable alkoxysilane, a polymerizable unsaturated monomer (ii) having a vinyl-type double bond and a cationic group, a polymerizable unsaturated monomer (iii) having a vinyl-type double bond and a hydroxylic group, and/or a polymerizable unsaturated monomer (iv) other than the above-mentioned polymerizable unsaturated monomers. It is to be noted that the polymerizable unsaturated vinylsilane monomer (i) and the polymerizable unsaturated monomer (ii) are essential but the polymerizable unsaturated monomers (iii and iv) are optional for the polymerization to obtain the acrylic copolymer having the hydrolyzable alkoxysilane group and the cationic group.

Examples of the above-mentioned polymerizable unsaturated vinylsilane monomer (i) are vinyltrimethoxy silane, vinyltriethoxy silane, vinyltris-β-methoxyethoxy silane, γ-(meth)acryloyl oxypropyltrimethoxy silane, and γ-methacryloyl oxypropylmethyldimethoxy silane.

The above-mentioned polymerizable unsaturated monomer (ii) having the vinyl-type double bond and the cationic group serves to introduce the cationic group which provides a water-dispersibility to the produced acrylic polymer. Examples of the cationic groups are tertiary amino groups, quaternary ammonium salt groups, tertiary phosphonium salt groups, and quaternary phosphonium salt groups. Of these groups, the tertiary amino group is the most preferable.

Examples of the polymerizable monomer having the vinyl-type double bond and the tertiary amino group are dialkylaminoalkyl (meth)acrylate such as dimethylaminopropyl (meth)acrylate, diethylaminoethyl (meth)acrylate, in which the alkyl preferably has one to six carbon atoms.

The above-mentioned polymerizable unsaturated monomer (iii) having the vinyl-type double bond and the hydroxylic group is optionally used to introduce hydroxylic groups into the acrylic copolymer. The hydroxylic group serves as a hydrophilic group for dispersing the acrylic copolymer in water and/or as a functional group for accomplishing cross-linking reaction within a dispersed particle. Examples of the polymerizable unsaturated monomer (iii) are hydroxyalkyl esters of (meth)acrylic acid such as 2-hydroxyethyl (meth)acrylate, and hydroxypropyl (meth)acrylate.

The above-mentioned other polymerizable unsaturated monomer (iv) is optionally used and the remaining components of the acrylic copolymer. Examples of the other polymerizable unsaturated monomer (iv) are alkyl (having 1 to 18 carbons) ester of (meth)acrylic acid such as methyl (meth)acrylate, ethyl (meth)acrylate, propyl (meth)acrylate, isopropyl (meth)acrylate; vinyl aromatic monomers such as α-methyl styrene and vinyl toluene; amide derivatives of (meth)acrylic acid which does not have tertiary amino group; and (meth)acrylonitrile. These monomers are known per se and are usually used as monomers for the synthesis of acrylic resin.

The above-mentioned four kinds of unsaturated monomers (i, ii, iii and iv) for the acrylic copolymer are used in the following blended ratios:

The unsaturated monomer (i): preferably 1 to 30 parts by weight, more preferably 3 to 20 parts by weight;

The unsaturated monomer (ii): preferably 5 to 30 parts by weight, more preferably 5 to 25 parts by weight;

The unsaturated monomer (iii): preferably 0 to 30 parts by weight, more preferably 5 to 20 parts by weight; and The unsaturated monomer (iv): preferably 10 to 94 parts by weight, more preferably 35 to 82 parts by weight.

The copolymerization of the above four unsaturated monomers (i, ii, iii and iv) is carried out by methods known per se, particularly by a solution polymerization method. An example of the solution polymerization method is as follows: The mixture of the above-mentioned unsaturated monomers is continuously reacted at a temperature of about 0° to about 180° C. for about 1 to about 20 hours in a suitable solvent in the presence of a radical polymerization catalyst. The resultant acrylic copolymer has an amine value preferably of about 10 to about 100, more preferably of about 15 to about 80; a hydroxyl value preferably of 0 to about 200, more preferably about 30 to about 130; and a number $ average molecular weight preferably of about 5000 to about 100000, more preferably of about 7000 to about 30000.

Examples of the cationic acidic colloidal silica are "Adelits CT-3000" and "Adelits CT-400" (the trade names of Asahi Denka Kogyo Kabushiki Kaisha in Japan), "Snowtex O " (the trade name of Nissan Chemical Industries, Ltd. in Japan), and "Cataloid SN" (the trade name of Catalysts & Chemicals Ind. Co., Ltd. in Japan). The cationic acidic colloidal silica contains $SiO_2$ as a basic unit dispersed in water. The colloidal silica has preferably an average particle size ranging from 0.004 to 0.1 μm.

Dispersing the mixture of the cationic acidic colloidal silica and the acrylic copolymer is carried out by a method known per se. For example, the acrylic copolymer having the alkoxysilane group, the cationic group and optionally the hydroxylic group is neutralized with about 0.1 to 1 equivalent of an acid, for example, a water-soluble carboxylic acid such as formic acid, acetic acid, lactic acid and hydroxyacetic acid. Thereafter, the thus neutralized acrylic copolymer is dispersed in water so as to have a solid content of 40% by weight.

In the cationic electrodeposition paint composition of the present invention, the blended amount of the colloidal silica-containing gelled particulate is not particularly limited. However, the blended amount is preferably 5 to 30 parts by weight (in solid content), more preferably 10 to 20 parts by weight relative to 100 parts by weight of the cationic electrodeposition paint composition (in resin solid content). This is because the edge corrosion resistance is inferior if the blended amount is less than 5 parts by weight while smoothing the surface of the electrodeposition paint film is difficult with the intermediate coat paint film if the blended amount is larger than 30 parts by weight.

The above-mentioned alkyltin ester compound (3) of the liquid aliphatic carboxylic acid as a component of the cationic electrodeposition paint composition (II) is a liquid tin catalyst such as dibutyltin dilaurate, dibutyltin diacetate and dioctyltin diacetate. The alkyltin ester compound is essential to improve the smoothness of the coated surface of the electrodeposition paint. Even if dioctyltin oxide as another tin compound is used in place of the alkyltin ester compound, the smoothness of the coated paint film cannot be improved, so that the smoothing the coated surface is difficult with the intermediate coat paint film. The blended amount of the alkyltin ester compound is not particularly limited and is suitably selected according to performances required for the electrodeposition paint composition. However, the blended amount is preferably 0.1 to 10 parts by weight, more preferably 0.2 to 5 parts by weight relative to the electrodeposition paint composition (in resin solid content). This is because the smoothness of the coated surface of the electrodeposition paint film cannot be improved if the blended amount is less than 1.0 part by weight while the stability of the cationic electroposition paint composition is inferior if the blended amount exceeds 10 parts by weight.

The intermediate coat or second paint film (II) is coated on the first or electrodeposition paint film (I) of the electrodeposition paint composition. The intermediate coat film is formed by coating an intermediate coat paint composition having the hardening starting time ranging from 15 to 20 minutes, determined according to the logarithmic decrement of viscoelasticity measured by the oscillated pendulum type viscoelastity measuring device. The range of the hardening starting time has been determined for the reasons set forth below. If the time is less than 15 minutes, it is difficult to smooth the unevenness of the surface of the electrodeposition paint film. If the time exceeds 20 minutes, smoothing the surface of the electrodeposition paint film is sufficiently achieved on a horizontal plane; however, run of the intermediate coat paint occurs on a vertical plane, thereby degrading the external appearance of the coated paint film coating.

The method of determining the minimum melt viscosity ($\lambda$ min) of the electrodeposition paint and the hardening starting time (t) of the intermediate coat paint is discussed below.

MINIMUM MELT VISCOSITY ($\lambda$min)

The viscoelasticity of the electrodeposition paint was measured according to Oscillated Pendulum Analysis (OPA) or by an oscillated pendulum type viscoelasticity measuring device (the trade name "Rheo-Vibron DDV-OPA") produced by Orientic Corporation in Japan, under conditions of weight: 22 g, moment of inertia: 859 g.cm$^2$, and temperature rising rate: 20° C./min. In the course of this viscoelasticity measurement, the lowest logarithmic decrement ($\lambda$ min) was measured to obtain the minimum melt viscosity ($\lambda$ min). FIG. 1 illustrates a method for determining the minimum melt viscosity ($\lambda$ min) for the electrodeposition paint.

HARDENING STARTING TIME (t)

Figure 2:
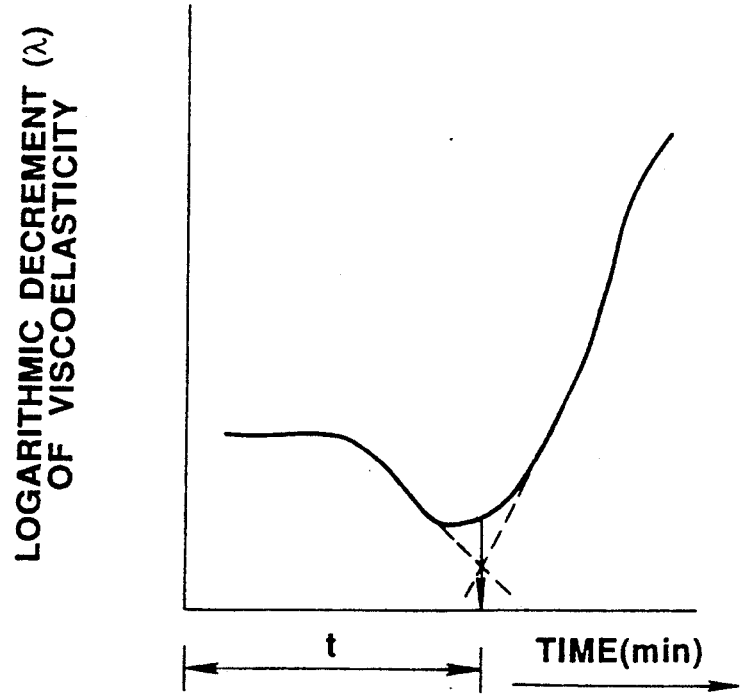
FIG. 2 is a graph showing the relationship between time and logarithmic decrement, for the purpose of determining the hardening starting time (t) of the second or intermediate coat paint film of the composite paint film according to the present invention.

The viscoelasticity of the intermediate coat paint was measured according to Oscillated Pendulum Analysis (OPA) or by the oscillated pendulum type viscoelasticity measuring device (the trade name "Rheo-Vibron DDV-OPA") produced by Orientic Corporation in Japan, under conditions of weight: 22 g, moment of inertia: 859 g.cm$^2$, and heating schedule: heating at 40° C. for 5 minutes→temperature rising at a rate of 10° C./min and for 10 minutes→maintaining the temperature at 140° C. In the course of this viscoelasticity measurement, a time duration (t) between a time point of starting heating and a time point of starting in rise of a logarithmic decrement of viscoelasticity as shown in FIG. 2 was determined to obtain the hardening starting time (t). FIG. 2 illustrates a method for determining the hardening starting time (t) for the intermediate coat paint.

EXPERIMENT

In order to evaluate the composite paint film coating of the present invention, the following discussion concerns a variety of experiments concerning production of the electrodeposition paint and the intermediate coat paint and Examples and Comparative Examples of the composite paint film coating obtained by combining the paints described above.

1. A blocked isocyanate-hardening type amine-added epoxy resin A

Production 1

465 parts by weight of bisphenol A type epoxy resin "Araldite No. 6071 (the trade name of Nippon Ciba-Geigy (Japan) Ltd. in Japan)" having a number average molecular weight of about 900 and an epoxy equivalent of about 465 was dissolved in 200 parts by weight of methylethyl ketone, to which 105 parts by weight of diethanol amine was added. Then, the reaction was continued at 80° C. until a tertiary amine value was raised to 98 (for over about 3 hours) thereby obtaining a "compound A-1" having a hydroxyl equivalent of 285.

Consequently 200 parts by weight of dimer acid-system polyamide resin "Tommide No. 225X (the trade name of Juji Chemical Industry Co., Ltd. in Japan)" having a number average molecular weight of about 1000 and an amine value of about 300 was mixed with 50 parts by weight of methylisobutyl ketone, and then the mixture was refluxed to carry out the reaction with heating. The reaction was continued until dehydration was completed. Therafter, unreacted substances were removed under vacuum thereby to obtain 240 parts by weight of a "compound B-1" having a primary amino group equivalent of about 485.

250 parts by weight of 4, 4'-diphenylmethane diisocyanate was dissolved in 162 parts by weight of methylethyl ketone, to which 112.5 parts by weight of ethyleneglycol monoethylether was added. Then, the reaction was continued at 50° C. until the isocyanate value was lowered to 116 and thereafter hexamethylene diisocyanate was added thereby to obtain a mixture of a "compound C-1" and a "compound D-1".

The compound B-1 and 124 parts by weight of methylethyl ketone were added to the compound A-1 as obtained above and heated at 80° C., to which the mixture of the compound C-1 and the compound D-1 was gradually dropped at the same temperature. Furthermore, the reaction was continued at the same temperature until an increase in viscosity stopped (for over about 30 minutes) thereby obtaining a resinous product.

2. Colloidal silica-containing micro-gel

Production 2

Isopropyl alcohol in an amount of 320 parts by weight was supplied to a 1 liter flask equipped with a stirrer, a temperature, a condenser and a heating mantle and heated to a refluxing temperature (about 83° C.) this flask, the below-listed mixture of monomers and polymerization initiator was dropped at a refluxing temperature of about 83° to 87° C. over about 2 hours.

| Mixture | |
|---|---|
| Styrene | 272 (parts by wt.) |
| n-butylacrylate | 224 |
| 2-hydroxyethylacrylate | 80 |
| dimethylaminoethylmethacrylate | 144 |
| KBM-503[a] | 80 |
| Azobisisobutyronitrile | 24 |

Note [a] KBM-503 is γ-methacryloxy propyltrimethoxy silane and the trade name of Shin-Etsu Chemical Co., Ltd. in Japan.

Subsequently, after stirring for 30 minutes, a solution obtained by dissolving 8 parts by weight of azobis-dimethyl valeronitrile was added to 120 parts by weight of isopropyl alcohol and dropped over about 1 hour and stirred for about 1 hour. Therafter, 320 parts by weight of isopropyl alcohol was added to cool the contents of the flask, thus obtaining an acrylic copolymer varnish having a solid content of 51% by weight, an amine value of 64, a hydroxyl value of 48 and a number average molecular weight of about 20000.

The thus obtained acrylic copolymer varnish in an amount of 480 parts by weight was deposited into a 2 liter flask. Into this flask, 196 parts by weight of a cationic acidic colloidal silica "Adelites CT-300 (the trade name of Asahi Denka Kogyo Kabushiki Kaisha)" having a solid content of 20% by weight and 4.0 parts by weight of acetic acid were added and stirred at about 30° C. for 5 minutes. Thereafter, 740 parts by weight of deionized water was dropped under strong stirring over about 30 minutes, and then stirring was continued for about 3 hours upon raising the temperature to 75 to 80 of the cationic acidic colloidal silica-containing gelled particulates in which cross-linking was made in the particulate, the dispersion liquid being milk white and having a solid content of 20% by weight. The particulates have an average particle size of 0.08 μm.

Production 3

An acrylic copolymer varnish was obtained by using the below-listed mixture of monomers in a manner similar to that in Production 2.

| Mixture | |
|---|---|
| styrene | 304 (parts by wt.) |
| n-butylmethacrylate | 280 |
| 2-hydroxyethylacrylate | 80 |
| dimethylaminopropylacrylamide | 56 |
| KBM-503 | 80 |

The obtained cyclic copolymer varnish had a solid content of 50% by weight, an amine value of 25, a hydroxyl value of 48 and a number average molecular weight of about 15000.

The acrylic copolymer varnish in an amount of 490 parts by weight was deposited into a 2 liter flask. Into this flask, 196 parts by weight of a cationic acidic colloidal silica "Adelits CT-400 (the trade name of Asahi Denka Kogyo Kabushiki Kaisha)" having a solid content of 20% by weight and 3.4 parts by weight of acetic acid were added and stirred at about 30° C. for 5 minutes. Thereafter, 732 parts by weight of deionized water was dropped under strong stirring over about 30 minutes, and then stirring was made for about 4 hours upon raising the temperature to 50° C., thus obtaining a dispersion liquid ("Micro gel B") of the cationic acidic colloidal silica-containing gelled particulates in which cross-linking was made in the particulate, the dispersion liquid being milk white and having a solid content of 20% by weight. The particulates have an average particle size of 0.10 μm.

3. Pigment paste

Production 4

A mixture having the composition shown in Table 1 was mixed and pulverized by a ball mill to have the maximum particle size smaller than 15 microns.

TABLE 1

| | Pigment paste (A) | Pigment paste (B) | Pigment paste (C) |
|---|---|---|---|
| Modified epoxy[b] resin | 5 (parts by wt.) | 5 (parts by wt.) | 5 (parts by wt.) |
| Titanium oxide | 19 | 24 | 14 |
| Purified clay | 5 | 0 | 10 |
| Carbon black | 1 | 1 | 1 |
| Dioxyltinoxide (DOTO) | — | — | 3 |
| Deionized water | 39.7 | 39.7 | 76.7 |
| Total | 69.7 | 69.7 | 76.7 |

Note [b]: The modified epoxy resin was prepared by kneading well a mixture of 4.8 parts by weight of the resinous product or solution of Production 1 and 0.2 part by weight of acetic acid.

4. Alkyltin ester compound (liquid tin compound)

A: Dibutyltin diacetate
B: Dibutyltin dilaurate

5. Electrodeposition paint

Production 5

131 parts by weight of the blocked isocyanate hardening-type amine-added epoxy resin (the resinous product) of Production 1 was well mixed with 5 parts by weight of diethylene monobutylether, 2 parts by weight of polypropylene glycol "Sunnix PP-4000 (the trade name of Sanyo Chemical Industries Ltd. in Japan)" and 1 part of dibutyltin diacetate. To this mixture, 0.8 part by weight of acetic acid and 20 parts by weight of 10% lead acetate aqueous solution were well mixed and thereafter 125 parts by weight of deionized water was added to dilute the mixture to control the resin solid content at 35% by weight, thus obtaining an aqueous dispersion varnish.

To this aqueous dispersion varnish, 75 parts by weight of the micro-gel A (having a 20% solid content) of Production 2 and 69.7 parts by weight of the pigment paste (A) of Production 4 were added upon stirring.

This mixture was diluted with 294.3 parts by weight of deionized water thus to obtain a cationic electrodeposition paint.

Production 6

An electrodeposition paint was prepared in the same manner as that in Production 5 with the exception that dibutyltin acetate was replaced with dibutyltin laurate.

Production 7

An electrodeposition paint was prepared in the same manner as that in Production 5 with the exception that the micro-gel A was replaced with the micro-gel B.

Production 8

An electrodeposition paint was prepared in the same manner as that in Production 5 with the exception that dibutyltin acetate and the micro-gel A were replaced with dibutyltin laurate and the micro-gel B, respectively.

Production 9

An electrodeposition paint was prepared in the same manner as that in Production 5 with the exception that the pigment paste (A) was replaced with the pigment paste (B).

Production 10

An electrodeposition paint was prepared in the same manner as that in Production 5 with the exception that the pigment paste (A) and dibutyltin acetate were replaced with the pigment paste (B) and dibutyltin laurate, respectively.

Production 11

An electrodeposition paint was prepared in the same manner as that in Production 5 with the exception that the pigment paste (A) and the micro gel (A) were replaced with the pigment paste (B) and the micro-gel (B), respectively.

Production 12

An electrodeposition paint was prepared in the same manner as that in Production 5 with the exception that the pigment paste (A), the micro-gel A and dibutyltin acetate were replaced with the pigment paste (B), the micro-gel B and dibutyltin laurate, respectively.

Production 13

An electrodeposition paint was prepared in the same manner as that in Production 5 with the exception that the pigment paste (A) was replaced with the pigment paste (C) and that the micro-gel A and dibutyltin laurate were not added.

Production 14

An electrodeposition paint was prepared in the same manner as that in Production 5 with the exception that the pigment paste (A) was replaced with the pigment paste (C) and that dibutyltin acetate was not added.

6. Intermediate cost paint

Productions 15 to 19

Each intermediate coat paint was prepared with compositions shown in Table 2.

80 parts by weight of titanium oxide (pigment) and 0.3 part by weight of carbon black (pigment) were blended with a total of 100 parts by weight (in solid content) of (A), (B), and (C) components shown in Table 2. The pigments had been supplied together with the (A) component into a pebble ball mill, and well mixed and dispersed for 24 hours.

TABLE 2

| | Production No. | | | | |
|---|---|---|---|---|---|
| | 5 | 16 | 17 | 18 | 19 |
| Blended amount (part by wt. in solid content) | | | | | |
| (A) component[1] | 65 | 60 | 50 | 40 | 70 |
| (B) component[2] | 5 | 10 | 20 | 30 | — |
| (C) component[3] | 30 | 30 | 30 | 30 | 30 |
| Xylol/n-Butanol = 8/2 | 10 | 10 | 10 | 10 | 10 |
| Pigment | 80.3 | 80.3 | 80.3 | 80.3 | 80.3 |
| Surface active agent | 0.1 | 0.1 | 0.1 | 0.1 | 0.1 |
| Hardening starting time (min.) by OPA | 15 | 20 | 25 | 27 | 10 |

Note [1]: (A) component was a polyester resin (for an intermediate coat paint) which was made from phthalic anhydride, adipic acid, trimethylol propane, neopentyl glycol and 1,6-hexanediol and had a weight average molecular weight of 9000, a hydroxyl value of 110 and an acid value of 10.0. The (A) component was in a 60% solution in a mixture dilution solvent of xylol : n-butanol = 80 : 20.
[2]: (B) component was a low molecular weight polyester resin which was made from the same compounds as those in the (A) component and had a weight average molecular weight of 1500, a hydroxyl value of 160 and an acid value of 5.0. The (B) component was in an 80% solution in a mixed dilution solvent of xylol : n-butanol = 80 : 20.
[3]: (C) component was a melamine resin (Cymel 327: the trade name of American Cyanamid Co.) having an average concentration degree of 1.8 and having 1.5 amino groups, 0.7 methylol group and 3 methoxy groups per one triamylene nucleus.

7. Preparation of Plate Coated with Electrodeposition Paint

An electrodeposition painting with the electrodeposition paints of Productions 5 to 14 was carried out onto an automotive steel sheet treated with zinc phosphate, under such conditions that the average film thickness of the coated electrodeposition film after baking became 20 microns. The baking was taken place at 175° C. for 30 minutes. Thus, nine kinds of plates coated with different electrodeposition paints were prepared.

The automotive steel sheet was used as a cathode in the electrodeposition painting and produced by Nippon test Panel Industry Co., Ltd. in Japan. The automotive steel sheet had an average surface roughness of 0.9 micron.

8. Painting Method of Intermediate and Finish Coat Paints

The above-mentioned intermediate coat paints of Production Nos. 15 to 19 were coated on the above ten kinds of electrodeposition paint coated-steel sheet by spray-painting to have a coat film thickness of 30 to 40 μm. After being allowed to stand for a predetermined time, the coated sheets were baked at 140° C. for 30 minutes. Subsequently, the respective steel plates coated with the intermediate coat paints were further coated with an alkyd resin finish coat paint (Melami No. 1500 black: the trade name of Nihon Oil & Fats Co., Ltd.) to have a paint film thickness of 35 to 40 μm. Then for each steel plate was baked with the finish coat.

EXAMPLES 1 TO 16 AND COMPARATIVE EXAMPLES 1 TO 8

Concerning a variety of painting systems as shown in Table 3, edge corrosion (rust) resistance and hardening characteristics of the coated electrodeposition paint and finish condition of the finish coat paint were evaluated. The painting systems of Comparative Examples 1 to 8 are not within the scope of the present invention, while the painting systems of Examples 1 to 16 are within the scope of the present invention.

In Table 3, "Flow intermediate coat" means an intermediate coat using an intermediate coat paint which has a good flowability during hardening under baking.

The edge corrosion resistance in Table 3 was measured by the following method: A steel cutter knife blade (LB-10: trade name of OLFA Corporation in Japan) was chemically treated with PBL3020 (the trade name of Nihon Parkerizing Co., Ltd in Japan). Each of the above-mentioned nine kinds of electrodeposition paints was coated on the chemically treated knife blade and thereafter coated with the electrodeposition paint. Then, the coated electrodeposition paint was baked at 175° C. for 30 minutes. Thereafter the knife blades coated with the electrodeposition paints were subjected to a salt water spraying test of 168 hours. After the test, the number of rusted points at the edge section was counted as shown in Table 3.

TABLE 3

| | | Comparative Example | | | | | | | |
|---|---|---|---|---|---|---|---|---|---|
| | | 1 | 2 | 3 | 4 | 5 | 6 | 7 | 8 |
| Electro-deposition paint | Blended amount (part by wt.) | | | | | | | | |
| | Blocked isocyanate hardening-type amine-added epoxy resin (Production 1) | 131 | 131 | 131 | 131 | 131 | 131 | 131 | 131 |
| | Pigment dispsersed liquid (Production 4) | (C) 76.7 | (C) 76.7 | (C) 76.7 | (C) 76.7 | (C) 76.7 | (C) 76.7 | (C) 76.7 | (C) 76.7 |
| | Deionized water | 125 | 125 | 125 | 125 | 125 | 125 | 125 | 125 |
| | Colloidal silica-containing gelled particulate (Micro-gel) | | | | | | | | |
| | Production 2 | — | — | — | — | A 75 | A 75 | A 75 | A 75 |
| | Production 3 | — | — | — | — | — | — | — | — |
| | Alkyltin ester compound | — | — | — | — | — | — | — | — |
| | Minimum melt viscosity (λ min) | 0.15 | 0.15 | 0.15 | 0.15 | 0.15 | 0.15 | 0.15 | 0.15 |
| Hardening characteristics of intermediate coat paint (hardening starting time (min) by OPA) | Flow intermediate coat (10 min) | Production 19 | — | — | — | Production 19 | — | — | — |
| | Flow intermediate coat (15 min) | — | Production 15 | — | — | — | Production 15 | — | — |
| | Flow intermediate coat (20 min) | — | — | Production 16 | — | — | — | Production 16 | — |
| | Flow intermediate coat (25 min) | — | — | — | Production 17 | — | — | — | Production 17 |
| Edge corrosion resistance (number of rusted points) 168 hr | | 100< | 100< | 100< | 100< | 0 | 0 | 0 | 0 |
| PGD value after coating of finish coat paint | On horizontal plane | 1.0 | 1.0 | 1.0 | 1.0 | 0.7 | 0.9 | 0.9 | 1.0 |
| | On vertical plane | 0.5 | 0.5 | 0.5 | run 0.4 | 0.5 | 0.5 | 0.5 | run 0.4 |
| | | Example | | | | | | | |
| | | 1 | 2 | 3 | 4 | 5 | 6 | 7 | 8 |
| Electro-deposition paint | Blended amount (part by wt.) | | | | | | | | |
| | Blocked isocyanate hardening-type amine-added epoxy resin (Production 1) | 131 | 131 | 131 | 131 | 131 | 131 | 131 | 131 |
| | Pigment dispsersed liquid (Production 4) | (A) 69.7 | (A) 69.7 | (A) 69.7 | (A) 69.7 | (A) 69.7 | (A) 69.7 | (B) 69.7 | (B) 69.7 |
| | Deionized water | 125 | 125 | 125 | 125 | 125 | 125 | 125 | 125 |
| | Colloidal silica-containing gelled particulate (Micro-gel) | | | | | | | | |
| | Production 2 | A 75 | A 75 | A 75 | A 75 | — | — | — | — |
| | Production 3 | — | — | — | — | B 75 | B 75 | B 75 | B 75 |
| | Alkyltin ester compound | A 1.0 | A 1.0 | B 1.0 | B 1.0 | A | A | B | B |
| | Minimum melt viscosity (λ min) | 0.25 | 0.25 | 0.25 | 0.25 | 0.28 | 0.28 | 0.28 | 0.28 |
| Hardening characteristics of intermediate coat paint (hardening starting time (min) by OPA) | Flow intermediate coat (15 min) | Production 15 | — | Production 15 | — | Production 15 | — | Production 15 | — |
| | Flow intermediate coat (20 min) | — | Production 16 | — | Production 16 | — | Production 16 | — | Production 16 |
| Edge corrosion resistance (number of rusted points) 168 hr | | 5> | 5> | 5> | 5> | 0-1 | 0-1 | 0-1 | 0-1 |
| PGD value after coating of finish coat paint | On horizontal plane | 1.0 | 1.0 | 1.0 | 1.0 | 1.0 | 1.0 | 1.0 | 1.0 |
| | On vertical plane | 0.5 | 0.5 | 0.5 | 0.5 | 0.5 | 0.5 | 0.5 | 0.5 |
| | | Example | | | | | | | |
| | | 9 | 10 | 11 | 12 | 13 | 14 | 15 | 16 |

TABLE 3-continued

| Electro-deposition paint | Blended amount (part by wt.) | | | | | | | | |
|---|---|---|---|---|---|---|---|---|---|
| | Blocked isocyanate hardening-type amine-added epoxy resin (Production 1) | 131 | 131 | 131 | 131 | 131 | 131 | 131 | 131 |
| | Pigment dispsersed liquid (Production 4) | (B) 69.7 | (B) 69.7 | (B) 69.7 | (B) 69.7 | (B) 69.7 | (B) 69.7 | (B) 69.7 | (B) 69.7 |
| | Deionized water | 125 | 125 | 125 | 125 | 125 | 125 | 125 | 125 |
| | Colloidal silica-containing gelled particulate (Micro-gel) | | | | | | | | |
| | Production 2 | A 75 | A 75 | A 75 | A 75 | — | — | — | — |
| | Production 3 | — | — | — | — | B 75 | B 75 | B 75 | B 75 |
| | Alkyltin ester compound | A 1.0 | A 1.0 | B 1.0 | B 1.0 | A 1.0 | A 1.0 | A 1.0 | A 1.0 |
| | Minimum melt viscosity (λ min) | 0.22 | 0.22 | 0.22 | 0.22 | 0.24 | 0.24 | 0.24 | 0.24 |
| Hardening characteristics of intermediate coat paint (hardening starting time (min) by OPA) | Flow intermediate coat (15 min) | Production 15 | — | Production 15 | — | Production 15 | — | Production 15 | — |
| | Flow intermediate coat (20 min) | — | Production 16 | — | Production 16 | — | Production 16 | — | Production 16 |
| Edge corrosion resistance (number of rusted points) 168 hr | | 10> | 10> | 10> | 10> | 5> | 5> | 5> | 5> |
| PGD value after coating of finish coat paint | On horizontal plane | 1.0 | 1.0 | 1.0 | 1.0 | 1.0 | 1.0 | 1.0 | 1.0 |
| | On vertical plane | 0.5 | 0.5 | 0.5 | 0.5 | 0.5 | 0.5 | 0.5 | 0.5 |

What is claimed is:

1. A composite paint film comprising:
a first paint film (I) formed of an epoxy-based cationic electrodeposition paint composition and having a minimum melt viscosity not less than 0.2 during hardening, said minimum melt viscosity being determined according to a logarithmic decrement of viscoelasticity of said first paint film and by an oscillated pendulum type viscoelasticity measuring device, said epoxy-based cationic electrodeposition paint composition including
an amine-added epoxy resin (1) of the type which may be hardened with a blocked isocyanate,
a colloidal silica-containing gelled particulate (2) which is formed by dispersing a mixture of an acrylic copolymer having a hydrolyzable alkoxysilane group and a cationic group and a cationic acidic colloidal silica in water to carry out a crosslinking reaction in particles of said colloidal silica, and
an alkyltin ester compound (3) of a liquid aliphatic carboxylic acid; and
a second paint film (II) coated on said first paint film, said second paint film having a hardening starting time ranging from 5 to 20 minutes, said. hardening starting time being determined according to a logarithmic decrement of viscoelasticity of said second paint film and by said oscillated pendulum type viscoelasticity measuring device.

2. A composite paint film as claimed in claim 1, wherein said blocked isocyanate-hardening type amine-added epoxy resin is a reaction product of a reaction between a polyepoxide compound and one selected from the group consisting of amines a hydroxyl compound having a primary amino group.

3. A composite paint film claimed in claim 2, wherein said amines are selected from the group consisting of a mixture of primary monoamines and primary polyamines, a mixture of secondary monoamines and secondary polyamines, a mixture of primary and secondary polyamines, and a mixture of secondary monoamines and secondary polyamines which has a primary amino group.

4. A composite paint film as claimed in claim 2, wherein said polyepoxide compound has at least two epoxy groups per molecular and a number average molecular weight of at least 200.

5. A composite paint film as claimed in claim 2, wherein said polyepoxide compound is formed by a reaction between a polyphenol compound and epichlorohydrin.

6. A composite paint film as claimed in claim 1, wherein said acrylic copolymer is formed by copolymerization of a mixture including a polymerizable unsaturated vinylsilane monomer having a vinyl-type double bond and a hydrolizable alkoxysilane group, and a polymerizable unsaturated monomer having a vinyl-type double bond and a cationic group.

7. A composite paint film as claimed in claim 6, wherein said mixture includes a polymerizable unsaturated monomer having a vinyl type double bond and a hydroxyl group.

8. A composite paint film as claimed in claim 6, wherein said polymerizable vinylsilane monomer is one selected from the group consisting of vinyltrimethoxy silane, vinyltriethoxy silane, vinyltris-β-methoxyethoxy silane, γ-(meth)acryloyl oxypropyl trimethoxy silane and γ-methacryloyl oxypropylmethyldimethoxy silane.

9. A composite paint film as claimed in claim 6, wherein said polymerizable unsaturated monomer having a vinyl-type double bond and a cationic group is selected from the group consisting of dimethylaminopropyl (meth)acrylate, and diethylaminoethyl (meth)acrylate.

10. A composite paint film as claimed in claim 7, wherein said polymerizable unsaturated monomer having a vinyl-type double bond and a hydroxyl group is selected from the group consisting of 2-hydroxyethyl (meth)acrylate and hydroxypropyl (meth)acrylate.

11. A composite paint film as claimed in claim 7, wherein said mixture includes an additional monomer selected from the group consisting of an alkyl ester of (meth)acrylic acid, a vinyl aromatic monomer, an o amide derivative of (meth)acrylic acid and (meth)acrylonitrile.

12. A composite paint film as claimed in claim 11, wherein said alkyl ester of (meth)acrylic acid is selected from the group consisting of methyl (meth)acrylate, ethyl (meth)acrylate, propyl (meth)acrylate and isopropyl (meth)acrylate.

13. A composite paint film as claimed in claim 11, wherein said vinyl aromatic monomer is selected from the group consisting of sytrene, α-methyl styrene and vinyl toluene.

14. A composite paint film as claimed in claim 6, wherein said polymerizable unsaturated monomer having a vinyl-type double bond and a hydrolizable alkoxysilane is within a range from 1 to 30% by weight of said mixture.

15. A composite paint film as claimed in claim 14, wherein said-monomer is within a range from 3 to 20% by weight of said mixture.

16. A composite paint film as claimed in claim 6, wherein said polymerizable unsaturated monomer having a vinyl-type double bond and a cationic group is within a range from 5 to 30% by weight of said mixture.

17. A composite paint film as claimed in claim 16, wherein said monomer is within a range from 5 to 25% by weight of said mixture.

18. A composite paint film as claimed in claim 7, wherein said polymerizable unsaturated monomer having a vinyl type double bond and a hydroxyl group is within a range from 0 to 30% by weight of said mixture.

19. A composite paint film as claimed in claim 18, wherein said monomer is within a range from 5 to 20% by weight of said mixture.

20. A composite paint, film as claimed in claim 11, wherein said additional monomer is within a range from 10 to 94% by weight of said mixture.

21. A composite paint film as claimed in claim 20, wherein said additional monomer is within a range from 35 to 82% by weight.

22. A composite paint film as claimed in claim 1, wherein said acrylic copolymer has an amine value ranging from 10 to 100, a hydroxyl value ranging from 0 to 200, and a number average molecular weight of 5000 to 100000.

23. A composite paint film as claimed in claim 1, wherein said acrylic copolymer has an amine value ranging from 15 to 80, a hydroxylic value ranging from 30 to 130, and a number average molecular weight of 7000 to 30000.

24. A composite paint film as claimed in claim 1, wherein said cationic acidic colloidal silica has an average particle size ranging from 0.004 to 0.1 μm.

25. A composite paint film as claimed in claim 1, wherein said cationic acidic colloidal silica s within a range from 5 to 30 parts by weight relative to 100 parts by weight of a resinous solid content of said electrodeposition paint composition.

26. A composite paint film as claimed in claim 1, wherein said cationic acidic colloidal silica is within a range from 10 to 20 parts by weight of a resinous solid content of said electrodeposition paint composition.

27. A composite paint film as claimed in claim 1, wherein said alkyltin ester compound is selected from the group consisting of dibytyltin laurate, dibutyltin diacetate and dioctyltin diacetate.

28. A composite paint film as claimed in claim 1, wherein said alkyltin ester compound is within a range from 0.1 to 10 parts by weight relative to 100 parts by weight of a resinous solid content of said electrodeposition paint composition.

29. A composite paint, film as claimed in claim 1, wherein said alkyltin ester compound is within a range from 0.2 to 5 parts by weight relative to 100 parts by weight of a resinous solid content of said electrodeposition paint composition.

30. An outer panel of an automotive vehicle body, comprising:
  a steel sheet forming part of the automotive vehicle body;
  a first paint film (I) coated on said steel sheet and formed of an epoxy-based cationic electrodeposition paint composition and having a minimum melt viscosity not less than 0.2 during hardening, said minimum melt viscosity being determined according to a logarithmic decrement of viscoelasticity of said first paint film and by an oscillated pendulum type viscoelasticity measuring device, said epoxy-based cationic electrodeposition paint composition including
    an amine-added epoxy resin (1) of the type which may be hardened with a blocked isocyanate,
    a colloidal silica containing gelled particulate (2) which is formed by dispersing a mixture of an acrylic copolymer having a hydrolyzable alkoxysilane group and a cationic group and a cationic acidic colloidal silica in water to carry out a crosslinking reaction in particles of said colloidal silica, and
    an alkyltin ester compound (3) of a liquid aliphatic carboxylic acid; and
  a second paint film (II) coated on said first paint film, said second paint film having a hardening starting time ranging from 15 to 20 minutes, said hardening starting time being determined according to a logarithmic decrement of viscoelasticity of said second paint film and by said oscillated pendulum type viscoelasticity measuring device.

31. A method for preventing corrosion of steel panels which comprises coating at least one surface of said panels with a composite paint film comprising
  a first paint film (I) formed of an epoxy-based cationic electrodeposition paint composition and having a minimum melt viscosity not less than 0.2 during hardening, said minimum melt viscosity being determined according to a logarithmic decrement of viscoelasticity of said first paint film and by an oscillated pendulum type viscoelasticity measuring device, said epoxy-based cationic electrodeposition paint composition including
    an amine-added epoxy resin (1) of the type which may be hardened with a blocked isocyanate,
    a colloidal silica-containing gelled particulate (2) which is formed by dispersing a mixture of an acrylic copolymer having a hydrolyzable alkoxysilane group and a cationic group and a cationic acidic colloidal silica in water to carry out crosslining reactions in particles of said colloidal silica, an an alkyltin ester compound (3) of a liquid aliphatic carboxylic acid; and a second paint film (II) coated on said first paint film, said second paint film having a hardening starting time ranging from 5 to 20 minutes, said hardening starting time being determined according to a logarithmic decrement of viscoelasticity of said second paint film and by said oscillated pendulum type viscoelasticity measuring device.

* * * * *